(12) United States Patent
Mazany

(10) Patent No.: US 10,689,290 B2
(45) Date of Patent: Jun. 23, 2020

(54) FORMULATIONS FOR OXIDATION PROTECTION OF COMPOSITE ARTICLES

(71) Applicant: GOODRICH CORPORATION, Charlotte, NC (US)

(72) Inventor: Anthony M. Mazany, Amelia Island, FL (US)

(73) Assignee: GOODRICH CORPORATION, Charlotte, NC (US)

(*) Notice: Subject to any disclaimer, the term of this patent is extended or adjusted under 35 U.S.C. 154(b) by 94 days.

(21) Appl. No.: 16/116,665

(22) Filed: Aug. 29, 2018

(65) Prior Publication Data

US 2019/0016628 A1   Jan. 17, 2019

Related U.S. Application Data

(62) Division of application No. 14/671,637, filed on Mar. 27, 2015, now Pat. No. 10,087,101.

(51) Int. Cl.
| | |
|---|---|
| *C03C 3/19* | (2006.01) |
| *C04B 41/89* | (2006.01) |
| *C04B 41/00* | (2006.01) |
| *C04B 41/52* | (2006.01) |
| *F16D 69/02* | (2006.01) |
| *C03C 3/16* | (2006.01) |
| *C03C 8/08* | (2006.01) |
| *C03C 8/14* | (2006.01) |
| *C03C 8/24* | (2006.01) |
| *C03C 3/064* | (2006.01) |
| *C23D 3/00* | (2006.01) |

(Continued)

(52) U.S. Cl.
CPC .............. *C03C 3/19* (2013.01); *C03C 3/064* (2013.01); *C03C 3/16* (2013.01); *C03C 8/08* (2013.01); *C03C 8/14* (2013.01); *C03C 8/24* (2013.01); *C04B 41/009* (2013.01); *C04B 41/52* (2013.01); *C04B 41/89* (2013.01); *C23D 3/00* (2013.01); *C23D 5/02* (2013.01); *F16D 69/023* (2013.01); *F16D 2069/005* (2013.01)

(58) Field of Classification Search
None
See application file for complete search history.

(56) References Cited

U.S. PATENT DOCUMENTS

| | | |
|---|---|---|
| 2,685,539 A | 8/1954 | Woodburn, Jr. et al. |
| 2,685,540 A | 8/1954 | Woodburn, Jr. et al. |

(Continued)

FOREIGN PATENT DOCUMENTS

| | | |
|---|---|---|
| CN | 1046517 | 10/1990 |
| CN | 102515850 | 6/2012 |

(Continued)

OTHER PUBLICATIONS

European Patent Office, European Office Action dated Jul. 16, 2018 in Application No. 17174481.6.

(Continued)

*Primary Examiner* — Nathan T Leong
(74) *Attorney, Agent, or Firm* — Snell & Wilmer, L.L.P.

(57) ABSTRACT

The present disclosure includes carbon-carbon composite articles having oxidation protection coatings for limiting thermal and catalytic oxidation reactions and methods for applying oxidation protection coatings to carbon-carbon composite articles.

10 Claims, 5 Drawing Sheets

(51) Int. Cl.
*C23D 5/02* (2006.01)
*F16D 69/00* (2006.01)

(56) References Cited

U.S. PATENT DOCUMENTS

| | | | |
|---|---|---|---|
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,837,073 A | 6/1989 | McAllister et al. |
| 4,863,001 A | 9/1989 | Edmisten |
| 4,892,790 A | 1/1990 | Gray |
| 4,958,998 A | 9/1990 | Yamauchi et al. |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,401,440 A | 3/1995 | Stover et al. |
| 5,427,823 A | 6/1995 | Varshney et al. |
| 5,439,080 A | 8/1995 | Haneda et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,971,113 A | 10/1999 | Kesavan et al. |
| 5,981,072 A | 11/1999 | Mercuri et al. |
| 6,016,450 A | 1/2000 | Corck |
| 6,071,603 A | 6/2000 | Sakai et al. |
| 6,331,362 B1 | 12/2001 | Dupel et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,668,984 B2 | 12/2003 | Gray |
| 6,737,120 B1 | 5/2004 | Golecki |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,758,678 B2 | 9/2017 | Nicolaus et al. |
| 9,790,133 B2 | 10/2017 | Mazany |
| 2002/0058576 A1 | 5/2002 | Mazany et al. |
| 2002/0096407 A1 | 7/2002 | Gray |
| 2002/0123592 A1 | 9/2002 | Zhang et al. |
| 2003/0143436 A1 | 7/2003 | Forsythe et al. |
| 2004/0038032 A1 | 2/2004 | Walker et al. |
| 2004/0038043 A1* | 2/2004 | Golecki ............... C04B 41/009 428/426 |
| 2004/0213906 A1 | 10/2004 | Mazany et al. |
| 2005/0022698 A1 | 2/2005 | Mazany et al. |
| 2006/0159909 A1 | 7/2006 | Asian |
| 2007/0154712 A1* | 7/2007 | Mazany ............... C04B 41/009 428/408 |
| 2008/0142148 A1 | 6/2008 | Mazany |
| 2008/0311301 A1 | 12/2008 | Diss et al. |
| 2010/0266770 A1 | 10/2010 | Mazany et al. |
| 2011/0311804 A1 | 12/2011 | Diss |
| 2013/0022826 A1 | 1/2013 | Kmetz |
| 2014/0227511 A1 | 8/2014 | Mazany |
| 2014/0349016 A1 | 11/2014 | Don |
| 2015/0183998 A1 | 7/2015 | Belov et al. |
| 2015/0291805 A1 | 10/2015 | Nicolaus et al. |
| 2015/0362029 A1 | 12/2015 | Edwards et al. |
| 2016/0280585 A1 | 9/2016 | Mazany |
| 2016/0280612 A1 | 9/2016 | Mazany |
| 2017/0342555 A1 | 11/2017 | Mazany |
| 2017/0349825 A1 | 12/2017 | Mazany |
| 2017/0369713 A1 | 12/2017 | Poteet |
| 2017/0369714 A1 | 12/2017 | Nicolaus |

FOREIGN PATENT DOCUMENTS

| | | |
|---|---|---|
| CN | 101712563 | 9/2012 |
| CN | 103274760 | 9/2013 |
| CN | 105237039 | 1/2016 |
| CN | 107935634 | 4/2018 |
| EP | 200568 | 11/1986 |
| EP | 0677499 | 10/1995 |
| EP | 1043290 | 10/2000 |
| EP | 1693262 | 8/2006 |
| EP | 1834937 | 9/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3282038 | 2/2018 |
| EP | 3530637 | 8/2019 |
| GB | 2468378 | 9/2010 |
| JP | 09301786 | 11/1997 |
| JP | 2006036551 | 2/2006 |

(56) References Cited

FOREIGN PATENT DOCUMENTS

| | | |
|---|---|---|
| KR | 20050022947 | 3/2005 |
| WO | 9742135 | 11/1997 |
| WO | WO 9742135 | 11/1997 |
| WO | 0051950 | 9/2000 |
| WO | WO 0051950 | 9/2000 |
| WO | 03084899 | 10/2003 |
| WO | 2007078419 | 7/2007 |
| WO | WO 2007078419 | 7/2007 |
| WO | 2014035413 | 3/2014 |
| WO | WO 2014035413 | 3/2014 |
| WO | 2015169024 | 11/2015 |
| WO | WO 2015169024 | 11/2015 |

OTHER PUBLICATIONS

Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action dated Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Notice of Allowance dated Apr. 3, 2019 in U.S. Appl. No. 15/169,257.
USPTO, Restriction/Election Requirement dated Apr. 5, 2019 in U.S. Appl. No. 15/380,442.
USPTO, Non-Final Office Action dated Apr. 16, 2019 in U.S. Appl. No. 15/076,348.
USPTO, Final Office Action dated May 15, 2019 in U.S. Appl. No. 15/194,034.
USPTO, Advisory Action dated May 17, 2019 in U.S. Appl. No. 15/174,537.
European Patent Office, Communication Pursuant to Article 94(3) EPC dated Oct. 28, 2008 in European Application No. 06837063.4.
USPTO, Restriction Requirement dated Nov. 7, 2016 in U.S. Appl. No. 14/671,637.
USPTO, Preinterview First Office Action dated Mar. 6, 2017 in U.S. Appl. No. 14/671,637.
USPTO, First Action Interview Office Action dated May 12, 2017 in U.S. Appl. No. 14/671,637.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
European Patent Office, Extended European Search Report dated Nov. 6, 2017 in European Application No. 17174481.6.
USPTO, Final Office Action dated Jan. 17, 2018 in U.S. Appl. No. 14/671,637.
USPTO, Advisory Action dated Mar. 30, 2018 in U.S. Appl. No. 14/671,637.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
Steven A. Poteet, et al., U.S. Appl. No. 16/029,134, filed Jul. 6, 2018 titled "High Temperature Oxidation Protection for Composites ," 43 pages.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites ," 38 pages.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
European Patent Office, European Office Action dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.
USPTO, Advisory Action filed Nov. 20, 2019 in U.S. Appl. No. 15/234,903.
International Search Report and Written Opinion dated Apr. 20, 2005 in Application No. PCT/US2004/012222.
International Preliminary Report on Patentability dated Aug. 18, 2005 in Application No. PCT/US2004/012222.
International Search Report and Written Opinion dated Jul. 3, 2007 in Application No. PCT/US2006/043343.
Office Action dated Jan. 4, 2008 in Application No. 04816727.4.
Office Action dated Feb. 26, 2008 in U.S. Appl. No. 10/829,144.
International Preliminary Report on Patentability dated Mar. 12, 2008 in Application No. PCT/US2006/043343.
Final Office Action dated Jul. 16, 2008 in U.S. Appl. No. 10/829,144.
Office Action dated Oct. 24, 2008 in U.S. Appl. No. 10/829,144.
Communication Pursuant to Article 94(3) EPC dated Oct. 28, 2008 in European Application No. 06837063.4.
Restriction Requirement dated Feb. 5, 2009 in U.S. Appl. No. 11/315,592.
Final Office Action dated Jan. 29, 2009 in U.S. Appl. No. 10/829,144.
Communication Pursuant to Article 94(3) EPC dated Feb. 9, 2009 in European Application No. 06837063.4.
Office Action dated May 29, 2009 in U.S. Appl. No. 10/829,144.
Office Action dated Jun. 9, 2009 in U.S. Appl. No. 11/315,592.
Notice of Allowance dated Oct. 1, 2009 in U.S. Appl. No. 10/829,144.
Final Office Action dated Dec. 11, 2009 in U.S. Appl. No. 11/315,592.
Communication under Rule 71(3) EPC dated Feb. 4, 2010 in European Application No. 06837063.4.
Advisory Action dated Feb. 25, 2010 in U.S. Appl. No. 11/315,592.
Office Action dated Apr. 1, 2010 in U.S. Appl. No. 11/315,592.
Partial European Search Report dated Oct. 29, 2010 in European Application No. 10169627.6.
Office Action dated Feb. 4, 2011 in U.S. Appl. No. 12/619,061.
Office Action dated Feb. 22, 2011 in U.S. Appl. No. 12/829,178.
Extended European Search Report dated May 4, 2011 in European Application No. 10169627.6.
Final Office Action dated Aug. 19, 2011 in U.S. Appl. No. 12/829,178.

(56) References Cited

OTHER PUBLICATIONS

Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
Extended European Search Report dated Jul. 26, 2016 in European Application No. 16161832.7.
Restriction Requirement dated Nov. 7, 2016 in U.S. Appl. No. 14/671,637.
Preinterview First Office Action dated Mar. 6, 2017 in U.S. Appl. No. 14/671,637.
First Action Interview Office Action dated May 12, 2017 in U.S. Appl. No. 14/671,637.
Restriction Requirement dated Jan. 5, 2018 in U.S. Appl. No. 15/076,348.
Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Extended European Search Report dated Oct. 9, 2017 in European Application No. 17173709.1.
Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol . 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
Extended European Search Report dated Nov. 6, 2017 in European Application No. 17174481.6.
Final Office Action dated Jan. 17, 2018 in U.S. Appl. No. 14/671,637.
Communication Pursuant to Article 94(3) dated Jan. 3, 2018 in European Application No. 16161832.7.
Extended European Search Report dated Nov. 20, 2017 in European Application No. 17175809.7.
Extended European Search Report dated Nov. 20, 2017 in European Application No. 17178011.7.
Partial European Search Report dated Jan. 13, 2018 in European Application No. 17183478.1.
Advisory Action dated Mar. 30, 2018 in U.S. Appl. No. 14/671,637.
Non Final Office Action dated May 1, 2018 in U.S. Appl. No. 15/076,348.
Restriction/Election Requirement dated May 24, 2018 in U.S. Appl. No. 15/174,537.
Non Final Office Action dated Mar. 28, 2018 in Application No. 15234903.
European Search Report dated Apr. 11, 2018 in European Application No. 17183478.1-1103.
European Search Report dated Apr. 13, 2018 in European Application No. 17207767.9-1106.
USPTO, Restriction/Election Requirement dated Jun. 19, 2018 in U.S. Appl. No. 15/194,034.
USPTO, Non Final Office Action dated Jul. 27, 2018 in U.S. Appl. No. 15/174,537.
Steven A. Poteet, et al., U.S. Appl. No. 15/886,671, filed Feb. 1, 2018 titled "High Temperature Oxidation Protection for Composites," 45 pages.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Pre-Interview First Office Action dated Apr. 17, 2020 in U.S. Appl. No. 15/886,671.
European Patent Office, European Search Report dated Mar. 23, 2020 in Application No. 19207148.8.

* cited by examiner

FORMULATIONS FOR OXIDATION PROTECTION OF COMPOSITE ARTICLES

CROSS REFERENCE TO RELATED APPLICATIONS

This application is a Divisional of U.S. Ser. No. 14/671,637, filed Mar. 27, 2015, and entitled "FORMULATIONS FOR OXIDATION PROTECTION OF COMPOSITE ARTICLES," which is incorporated by reference herein in its entirety for all purposes.

FIELD OF INVENTION

The present disclosure related generally to carbon-carbon composites and, more specifically, to oxidation protection systems for carbon-carbon composite components.

BACKGROUND OF THE INVENTION

Oxidation protection systems for carbon-carbon composites are typically designed to minimize loss of carbon material due to oxidation at operating conditions, which include temperatures as high as 900° C. (1652° F.). Phosphate-based oxidation protection systems may reduce infiltration of oxygen and oxidation catalysts into the composite. However, despite the use of such oxidation protection systems, significant oxidation of the carbon-carbon composites may still occur during operation of components such as, for example, aircraft braking systems.

SUMMARY OF THE INVENTION

An article in accordance with various embodiments may comprise a carbon-carbon composite structure, an oxidation protection composition including a base layer disposed on an outer surface of the carbon-carbon composite structure and a sealing layer disposed on an outer surface of the base layer, wherein the base layer comprises a first phosphate glass composition having a boron nitride additive dispersed throughout the base layer, and wherein the sealing layer comprises a second phosphate glass composition and is substantially free of boron nitride. The first phosphate glass composition of the base layer may comprise between about 10 weight percent and about 35 weight percent of the boron nitride additive, and further, between about 15 weight percent and about 30 weight percent of the boron nitride additive. The first phosphate glass composition of the base layer may be represented by the formula $a(A'_2O)_x(P_2O_5)_{y1}b(G_fO)_{y2}c(A''O)_z$, where: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; $y_2$ is a number in the range from 0 to about 0.20; and z is a number in the range from about 0.01 to about 0.5; $(x+y_1+y_2+z)=1$; and $x<(y_1+y_2)$. The second phosphate glass composition of the sealing layer may be represented by the formula $a(A'_2O)_x(P_2O_5)_{y1}b(G_fO)_{y2}c(A''O)_z$, where: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; $y_2$ is a number in the range from 0 to about 0.20; and is a number in the range from about 0.01 to about 0.5; $(x+y_1+y_2+z)=1$; and $x<(y_1+y_2)$. The second phosphate glass composition may further comprise an aluminum phosphate. The article may comprise a component of an aircraft wheel braking assembly.

A method for limiting oxidation in a composite structure in accordance with various embodiments may comprise applying a base layer of a first phosphate glass composition on an outer surface of a carbon-carbon composite structure, wherein the base layer comprises between about 10 weight percent and about 35 weight percent of a boron nitride, heating the carbon-carbon composite structure to a temperature sufficient to adhere the base layer to the carbon-carbon composite structure, applying a sealing layer of a second phosphate glass composition on an outer surface of the base layer, wherein the second phosphate glass composition is substantially free of boron nitride, and heating the carbon-carbon composite structure to a temperature sufficient to adhere the sealing layer to the base layer. The first phosphate glass composition of the base layer may comprise between about 15 weight percent and about 30 weight percent of the boron nitride additive. The first phosphate glass composition may be represented by the formula $a(A'_2O)_x(P_2O_5)_{y1}b(G_fO)_{y2}c(A''O)_z$, where: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; y2 is a number in the range from 0 to about 0.20; and z is a number in the range from about 0.01 to about 0.5; $(x+y1+y2+z)=1$; and $x<(y1+y2)$. The second phosphate glass composition may be represented by the formula $a(A'_2O)_x(P_2O_5)_{y1}b(G_fO)_{y2}c(A''O)_z$: where: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; y1 is a number in the range from about 0.040 to about 0.950; $y_2$ is a number in the range from 0 to about 0.20; and z is a number in the range from about 0.01 to about 0.5; $(x+y_1+y_2+z)=1$; and $x<(y_1+y_2)$. The second phosphate glass composition may further comprise an aluminum phosphate. The method may further comprise forming a first slurry of the first phosphate glass composition by combining a pulverized first phosphate glass matrix with a first carrier fluid and the boron nitride. Applying the base layer of the first phosphate glass composition on the outer surface of the carbon-carbon composite structure may comprise spraying or brushing the first slurry of the first phosphate glass composition to the carbon-carbon composite structure.

The method may further comprise forming a second slurry of the second phosphate glass composition by combining the second phosphate glass composition with a second carrier fluid, wherein applying the sealing layer of the second phosphate glass composition on the base layer comprises spraying or brushing the second slurry of the second phosphate glass composition on the base layer. The second slurry may comprise between about 5.0 mol % and about 15 mol % ammonium dihydrogen phosphate. Prior to applying the base layer of the first phosphate glass composition to the carbon-carbon composite structure, a pretreating composition may be applied to the outer surface of the carbon-carbon composite structure, the pretreating composition comprising phosphoric acid and/or at least one acid phosphate salt, at least one aluminum salt, and optionally at least one additional salt, the carbon-carbon composite structure being porous, the pretreating composition penetrating at least some of a plurality of pores of the carbon-carbon composite structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
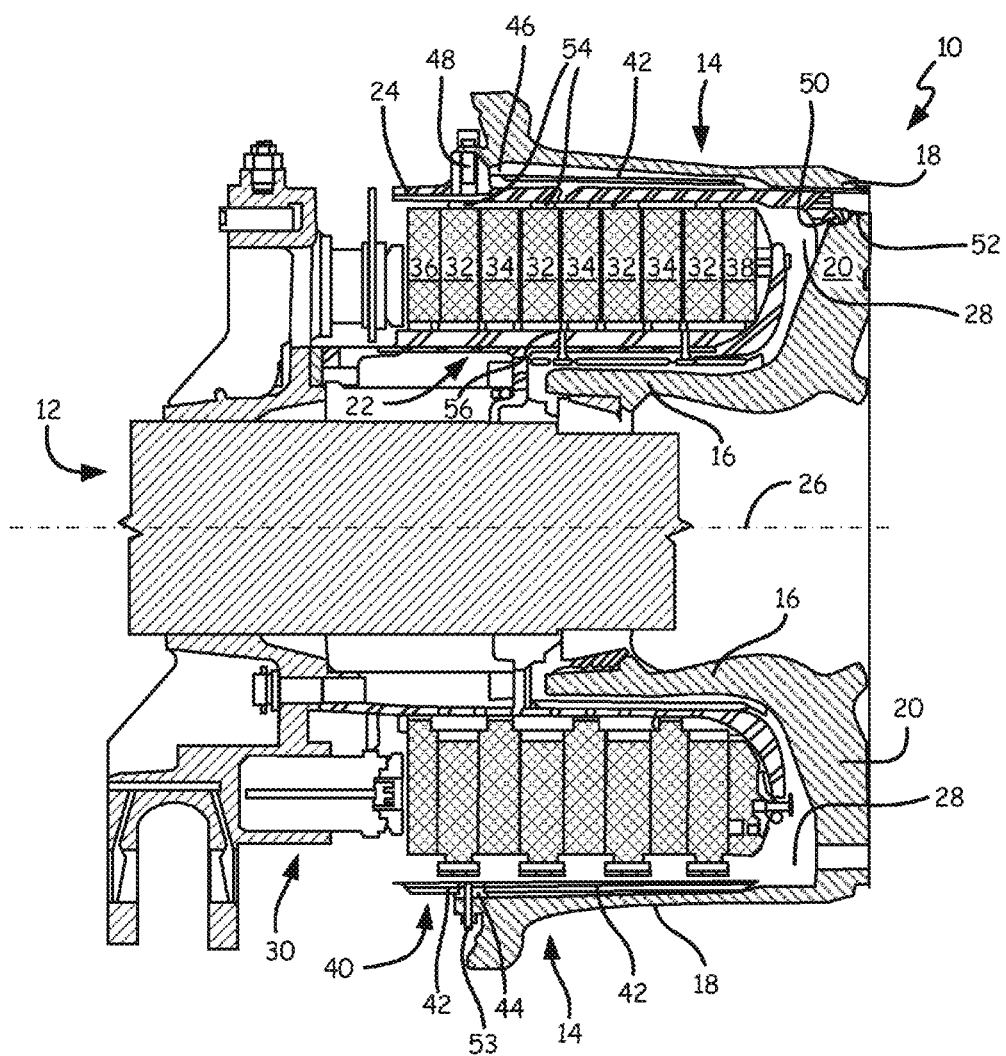
FIG. 1A illustrates a cross sectional view of an aircraft wheel braking assembly, in accordance with various embodiments.
Figure 1B:
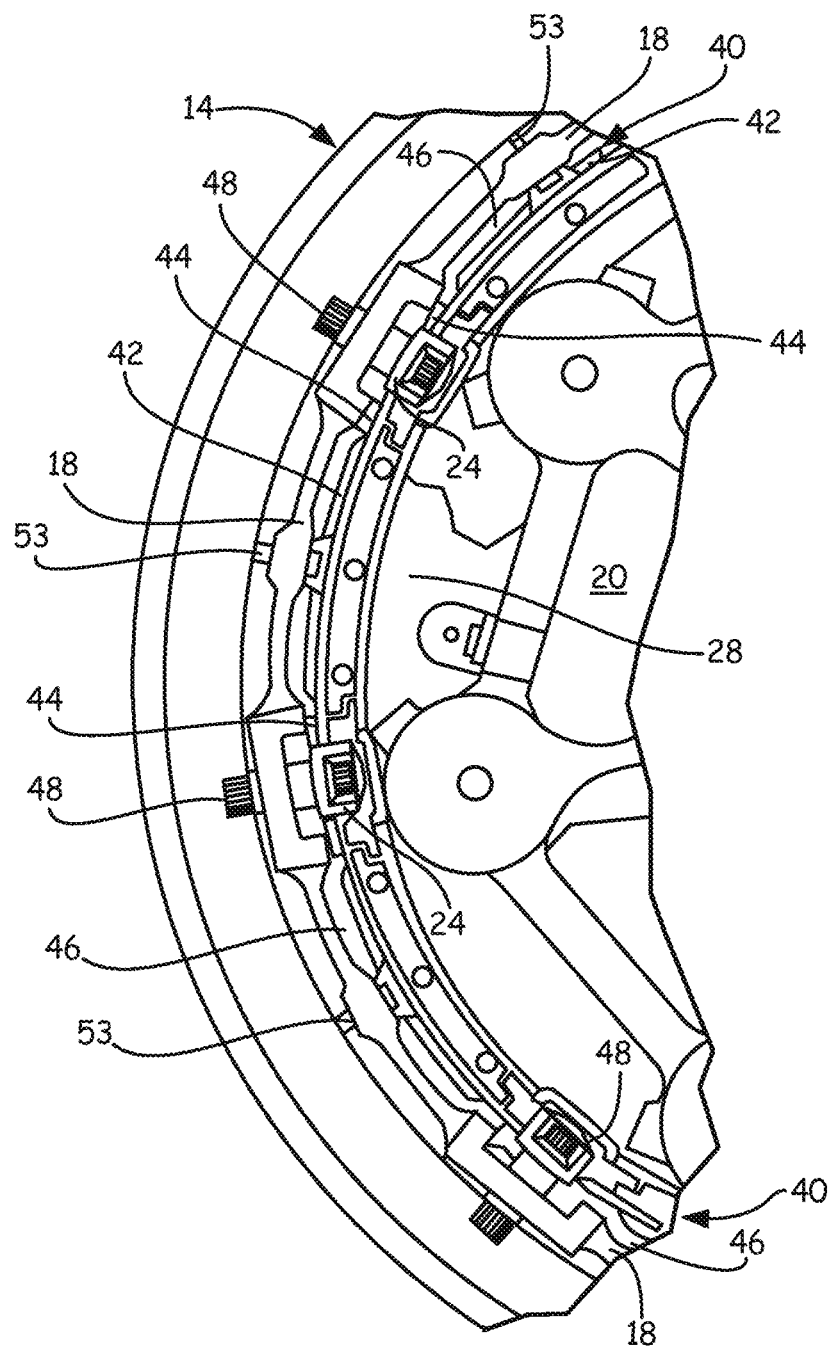
FIG. 1B illustrates a partial side view of an aircraft wheel braking assembly, in accordance with various embodiments.

With initial reference to FIGS. 1A and 1B, a wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut (not shown), such that torque take-out assembly 22 and stators 34 are prevented from rotating during braking of the aircraft.

Carbon-carbon composites in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon matrix. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. up to about 900° C. However, it will be recognized that the oxidation protection compositions and methods of the present disclosure may be readily adapted to many parts in this and other braking assemblies, as well as to other carbon-carbon composite articles susceptible to oxidation losses from infiltration of atmospheric oxygen and/or catalytic contaminants.

Figure 2:
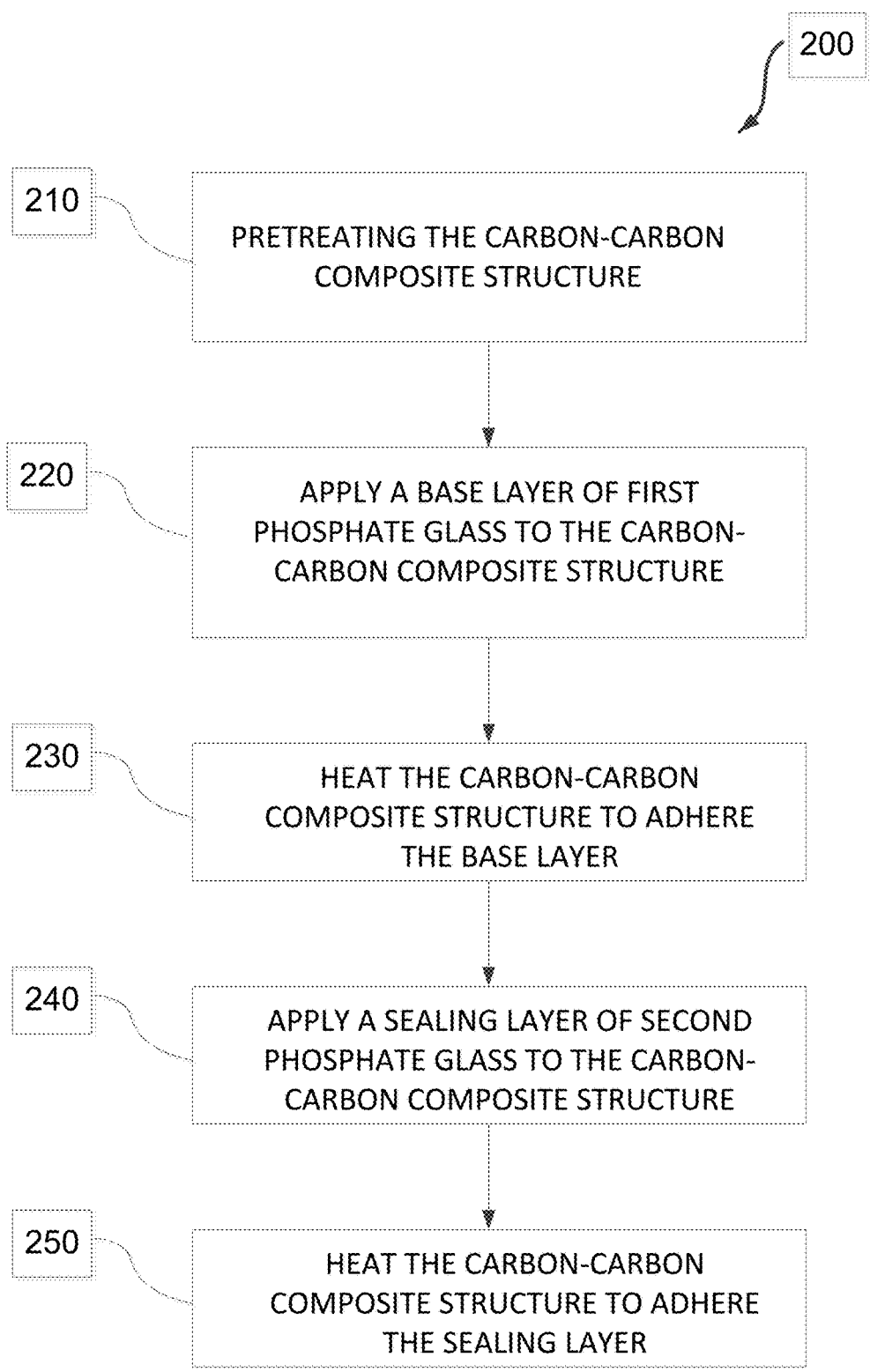
FIG. 2 illustrates a method for limiting an oxidation reaction in a composite substrate in accordance with various embodiments.

With initial reference to FIG. 2, a method 200 for limiting an oxidation reaction (e.g., a thermal or a catalytic oxidation reaction) in a composite substrate in accordance with various embodiments is illustrated. Method 200 may, for example, comprise applying an oxidation inhibiting composition to non-wearing surfaces of carbon-carbon composite brake components. In various embodiments, method 200 may be used on the back face of pressure plate 36 and/or end plate 38, an inner diameter (ID) surface of stators 34 including slots 56, as well as outer diameter (OD) surfaces of rotors 32 including lugs 54. The oxidation inhibiting composition of method 200 may be applied to preselected regions of a carbon-carbon composite that may be otherwise susceptible to oxidation. For example, aircraft brake disks may have the oxidation inhibiting composition applied on or proximate stator slots 56 and/or rotor lugs 54.

In various embodiments, method 200 may comprise a pretreatment step 210. Step 210 may, for example, comprise applying a first pretreating composition to the outer surface of a carbon-carbon composite, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The carbon-carbon composite may be porous, allowing the pretreating composition to penetrate at least some of the pores of the carbon-carbon composite.

In various embodiments, after applying the first pretreating composition, the component is heated to remove water and fix the aluminum oxide in place. For example, the component may be heated between about 100° C. (212° F.) and 200° C., and further, between 100° C. (212° F.) and 150° C. (392° F.).

Pretreatment step 210 may further comprise applying a second pretreating composition. In various embodiments, the second pretreating composition comprises a phosphoric acid and an aluminum phosphate, aluminum hydroxide, or aluminum oxide. The second pretreating composition may further comprise, for example, a second metal salt such as a magnesium salt. Further, the second pretreating composition may also comprise a surfactant or a wetting agent. In various embodiments, the second pretreating composition is applied to the component atop the first pretreating composition. The component may then, for example, be heated. In various embodiments, the component may be heated between about 600° C. (1112° F.) and about 800° C. (1472° F.), and further, between about 650° C. (1202° F.) and 750° C. (1382° F.).

Method 200 may further comprise, for example, a step 220 of applying a base layer of a first phosphate glass to the carbon-carbon composite structure. In various embodiments, the first phosphate glass composition comprises an acidic phosphate glass based on, for example, phosphorus pentoxide ($P_2O_5$).

The first phosphate glass composition may comprise a first phosphate glass matrix which is crushed and combined with one or more additional components to form the first phosphate glass composition. For example, the first phosphate glass matrix may comprise one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5.

Potential alkali metal glass modifiers may be selected from oxides of lithium, sodium, potassium, rubidium, cesium, and mixtures thereof. In certain embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The first phosphate glass matrix may be prepared by combining the above ingredients and heating them to a fusion temperature. In certain embodiments, depending on the particular combination of elements, the fusion temperature can be in the range from about 700° C. (1292° F.) to about 1500° C. (2732° F.). The melt may then be cooled and pulverized to form a frit or powder. In various embodiments, the first phosphate glass matrix may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the first phosphate glass matrix comprises from about 20 mol % to about 80 mol % of $P_2O_5$. In various embodiments, the first phosphate glass matrix comprises from about 30 mol % to about 70 mol % $P_2O_5$, or precursor thereof. In various embodiments, the first phosphate glass matrix comprises from about 40 to about 60 mol % of $P_2O_5$.

The first phosphate glass matrix can comprise from about 5 mol % to about 50 mol % of the alkali metal oxide. In various embodiments, the first phosphate glass matrix comprises from about 10 mol % to about 40 mol % of the alkali metal oxide. Further, the first phosphate glass matrix comprises from about 15 to about 30 mol % of the alkali metal oxide or one or more precursors thereof. In various embodiments, the first phosphate glass matrix can comprise from about 0.5 mol % to about 50 mol % of one or more of the above-indicated glass formers. The first phosphate glass matrix may comprise about 5 to about 20 mol % by weight of one or more of the above-indicated glass formers. As used herein, mol % is defined as the number of moles of a constituent per the total moles of the solution.

In various embodiments, the first phosphate glass matrix can comprise from about 0.5 mol % to about 40 mol % of one or more of the above-indicated glass network modifiers. The first phosphate glass matrix may comprise from about 2.0 mol % to about 25 mol % of one or more of the above-indicated glass network modifiers.

In various embodiments, the first phosphate glass matrix may represented by the formula:

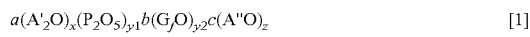

$$a(A'_2O)_x(P_2O_5)_{y1}b(G_fO)_{y2}c(A''O)_z \quad [1]$$

In Formula 1, A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.040 to about 0.950; $y_2$ is a number in the range from 0 to about 0.20; and z is a number in the range from about 0.01 to about 0.5; +$y_1$+$y_2$+z)=1; and x<($y_1$+$y_2$). The first phosphate glass matrix may be formulated to balance the reactivity, durability, and flow of the resulting glass barrier layer for optimal performance.

In various embodiments, crushed first phosphate glass matrix is combined with additional components to form the first phosphate glass composition. For example, crushed first phosphate glass matrix may be combined with ammonium hydroxide, ammonium dihydrogen phosphate, nanoplatelets (such as graphene-based nanoplatelets), among others. For example, graphene nanoplatelets could be added to the crushed first phosphate glass matrix. In various embodiments, the additional components may be combined and preprocessed before combining them with crushed the first phosphate glass matrix. Other suitable additional components include, for example, surfactants.

In various embodiments, the first phosphate glass composition may further comprise a boron nitride additive. For example, a boron nitride (such as hexagonal boron nitride) may be added to the first phosphate glass composition such that the resulting composition comprises between about 10 weight percent and about 30 weight percent of boron nitride. Further, the composition may comprise between about 15 weight percent and 25 weight percent of boron nitride. Boron nitride may be prepared for addition to the first phosphate glass composition by, for example, ultrasonically exfoliating the boron nitride in dimethylformamide (DMF), a solution of DMF and water, or 2-propanol solution. In various embodiments, the boron nitride additive may comprise a boron nitride that has been prepared for addition to the first phosphate glass composition by crushing or milling (e.g., ball milling) the boron nitride. The resulting boron nitride may be combined with pulverized first phosphate glass matrix (e.g., a frit or powder) in a first carrier fluid (such as, for example, water) to form a slurry, such as, for example, a first slurry.

Step 220 may comprise, for example, spraying or brushing the first slurry of the first phosphate glass composition onto the outer surface of the carbon-carbon composite structure. Any suitable manner of applying the base layer to carbon-carbon composite is within the scope of the present disclosure.

In various embodiments, method 200 further comprises a step 230 of heating the carbon-carbon composite structure to adhere the base layer to the carbon-carbon composite structure. The treated carbon-carbon composite may be heated (e.g., dried or baked) at a temperature in the range from about 200° C. (292° F.) to about 1000° C. (1832° F.). In various embodiments, the composite is heated to a temperature in a range from about 600° C. (1112° F.) to about 1000° C. (1832° F.), or between about 200° C. (292° F.) to about 900° C. (1652° F.), or further, between about 400° C. (752° F.) to about 850° C. (1562° F.). Step 230 may, for example, comprise heating the carbon-carbon composite structure for a period between about 0.5 hour and about 8 hours.

In various embodiments, the composite may be heated to a first, lower temperature (for example, about 30° C. (86° F.) to about 300° C. (572° F.)) to bake or dry the base layer at a controlled depth. A second, higher temperature (for example, about 300° C. (572° F.) to about 1000° C. (1832° F.)) may then be used to form a deposit from the base layer within the pores of the carbon-carbon composite. The duration of each heating step can be determined as a fraction of the overall heating time and can range from about 10% to about 50%. In various embodiments, the duration of the lower temperature heating step(s) can range from about 20% to about 40% of the overall heating time. The lower temperature step(s) may occupy a larger fraction of the overall heating time, for example, to provide relatively slow heating up to and through the first lower temperature. The exact heating profile will depend on a combination of the first temperature and desired depth of the drying portion.

Step 230 may be performed in an inert environment, such as under a blanket of inert gas (e.g., nitrogen, argon, and the like). For example, a carbon-carbon composite may be pretreated or warmed prior to application of the base layer to aid in the penetration of the base layer. Step 230 may be for a period of about 2 hours at a temperature of about 750° C. (1382° F.) to about 800° C. (1472° F.). The carbon-carbon composite and base layer may then be dried or baked in a non-oxidizing, inert or mostly inert atmosphere, e.g., noble gasses and/or nitrogen ($N_2$), to optimize the retention of the first phosphate glass composition of the base layer in the pores. This retention may, for example, be improved by heating the carbon-carbon composite to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the carbon-carbon composite.

Method 200 may further comprise a step 240 of applying a sealing layer of a second phosphate glass composition on an outer surface of the base layer. In various embodiments, the second phosphate glass composition is substantially free of boron nitride. In this case, "substantially free" means less than 0.01 percent by weight. For example, the second phosphate glass composition may comprise any of the glass compositions described in connection with the first phosphate glass composition, without the addition of a boron nitride additive. In various embodiments, the second phosphate glass composition may comprise the same reactive phosphate glass matrix used to prepare the first phosphate glass composition. In other embodiments, the second phosphate glass composition comprises a different reactive phosphate glass matrix from the first phosphate glass matrix.

Similarly to step 220, step 240 may comprise preparing a second phosphate glass composition slurry by combining the second phosphate glass composition with a second carrier fluid (such as, for example, water). Further, step 240 may comprise spraying or brushing slurry of the second phosphate glass composition on to the outer surface of the base layer. Any suitable manner of applying the sealing layer to the base layer is within the scope of the present disclosure.

Method 200 may further comprise a step 250 of heating the carbon-carbon composite structure to adhere the sealing layer to the base layer. Similarly to step 230, the carbon-carbon composite structure may be heated at a temperature sufficient to adhere the sealing layer to the base layer by, for example, drying or baking the carbon-carbon composite structure at a temperature in the range from about 200° C. (392° F.) to about 1000° C. (1832° F.). In various embodiments, the composite is heated to a temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.), wherein in this context, the term "about" means+/−10° C. Further, step 250 may, for example, comprise heating the carbon-carbon composite structure for a period between about 0.5 hour and about 8 hours, where the term "about" in this context only means+/−0.25 hours.

In various embodiments, step 250 may comprise heating the composite a first, lower temperature (for example, about 30° C. (86° F.) to about 300° C. (572° F.)) followed by heating at a second, higher temperature (for example, about 300° C. (572° F.) to about 1000° C. (1832° F.)). Further, step 250 may be performed in an inert environment, such as under a blanket of inert or mostly inert gas (e.g., nitrogen, argon, and the like).

Table 1 illustrates a variety of phosphate glass compositions in accordance with various embodiments.

TABLE 1

| | Phosphate Glass Composition | | | | | |
|---|---|---|---|---|---|---|
| | A | B | C | D | E | F |
| Wt % Glass Matrix | 75.01 | 75.01 | 76.71 | 69.74 | 80.2 | 73.22 |
| Wt % Boron Nitride | 0 | 0 | 21.07 | 28.09 | 17.53 | 24.54 |
| Wt % o-AlPO4 | 0 | 2.27 | 0 | 0 | 0 | 0 |

Phosphate glass compositions A and B comprise boron nitride-free phosphate glasses. For example, glasses A and B may be suitable sealing layers, such as the sealing layer applied in step 240 of method 200. Phosphate glass compositions C-F comprise boron nitride-containing phosphate glass. For example, glass compositions C-F may illustrate suitable base layers, such as base layers applied in step 220 of method 200. As illustrated, the boron nitride content of glass compositions C-F varies between about 17.53 and 28.09 weight percent boron nitride. However, any suitable boron nitride-containing phosphate glass (as described above) is in accordance with the present disclosure.

Figure 3:
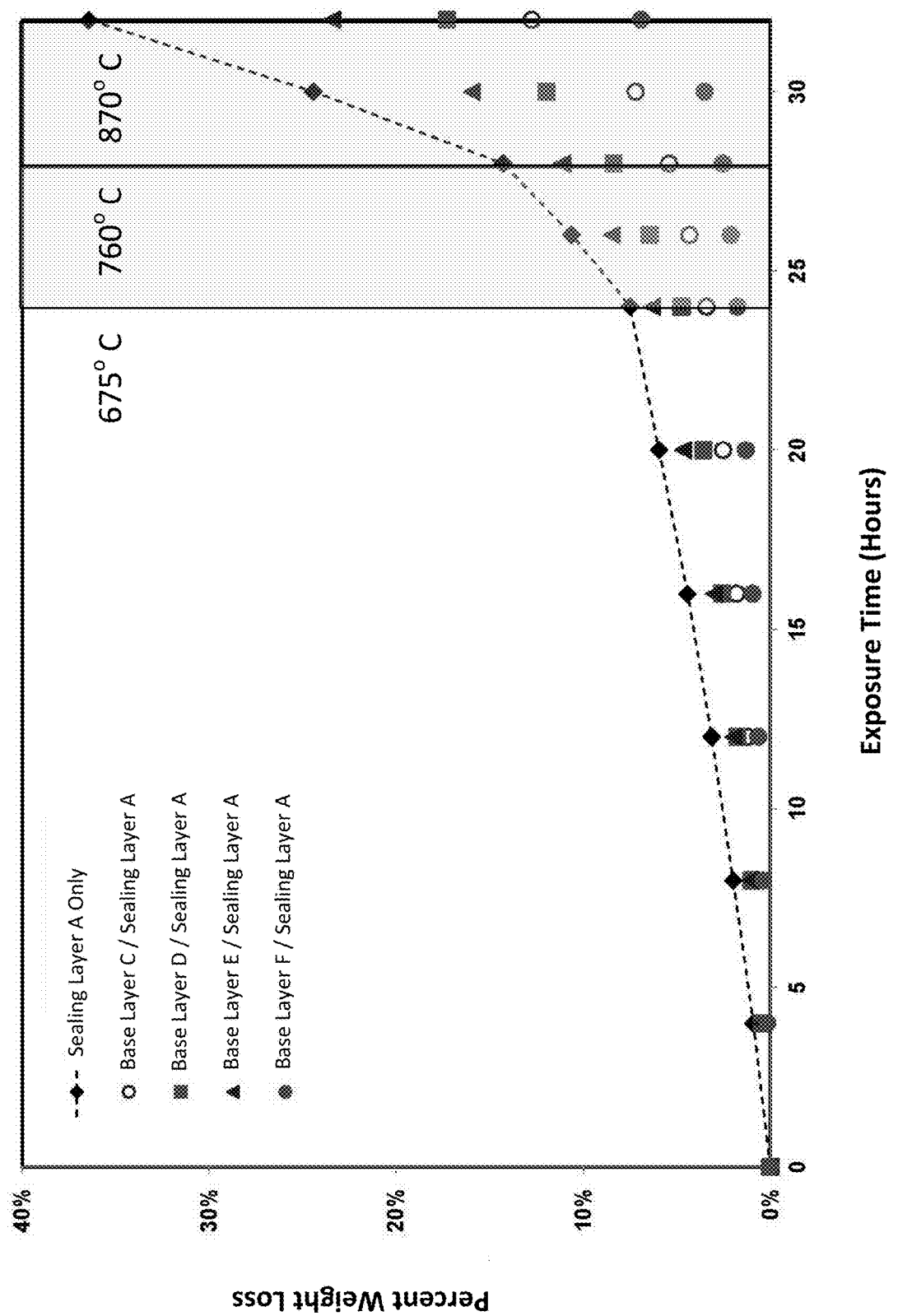
FIG. 3 illustrates experimental data obtained from testing various glass compositions in accordance with various embodiments at various temperatures.

With reference to FIG. 3 and Table 2 (below), experimental data obtained from testing various glass compositions in accordance with various embodiments is illustrated.

TABLE 2

| Base Layer | (none) | E | D | C | F |
|---|---|---|---|---|---|
| Sealing Layer | A | A | A | A | A |

| Oxidation Temp | Exposure Time (Hours) | Percentage Weight Loss | | | | |
|---|---|---|---|---|---|---|
| 675 Degrees C. | 0 | 0.00 | 0.00 | 0.00 | 0.00 | 0.00 |
| | 4 | 0.90 | 0.32 | 0.41 | 0.44 | 0.18 |
| | 8 | 1.98 | 0.70 | 1.01 | 1.07 | 0.39 |
| | 12 | 3.13 | 1.19 | 1.76 | 1.95 | 0.64 |
| | 16 | 4.41 | 1.80 | 2.56 | 2.98 | 0.95 |
| | 20 | 5.94 | 2.52 | 3.56 | 4.65 | 1.31 |
| | 24 | 7.48 | 3.41 | 4.73 | 6.29 | 1.76 |
| 760 Degrees C. | 26 | 10.63 | 4.31 | 6.43 | 8.47 | 2.11 |
| | 28 | 14.28 | 5.40 | 8.37 | 11.13 | 2.54 |
| 870 Degrees C. | 30 | 24.43 | 7.18 | 11.96 | 15.95 | 3.50 |
| | 32 | 36.45 | 12.76 | 17.27 | 23.43 | 6.89 |

Figure 4:
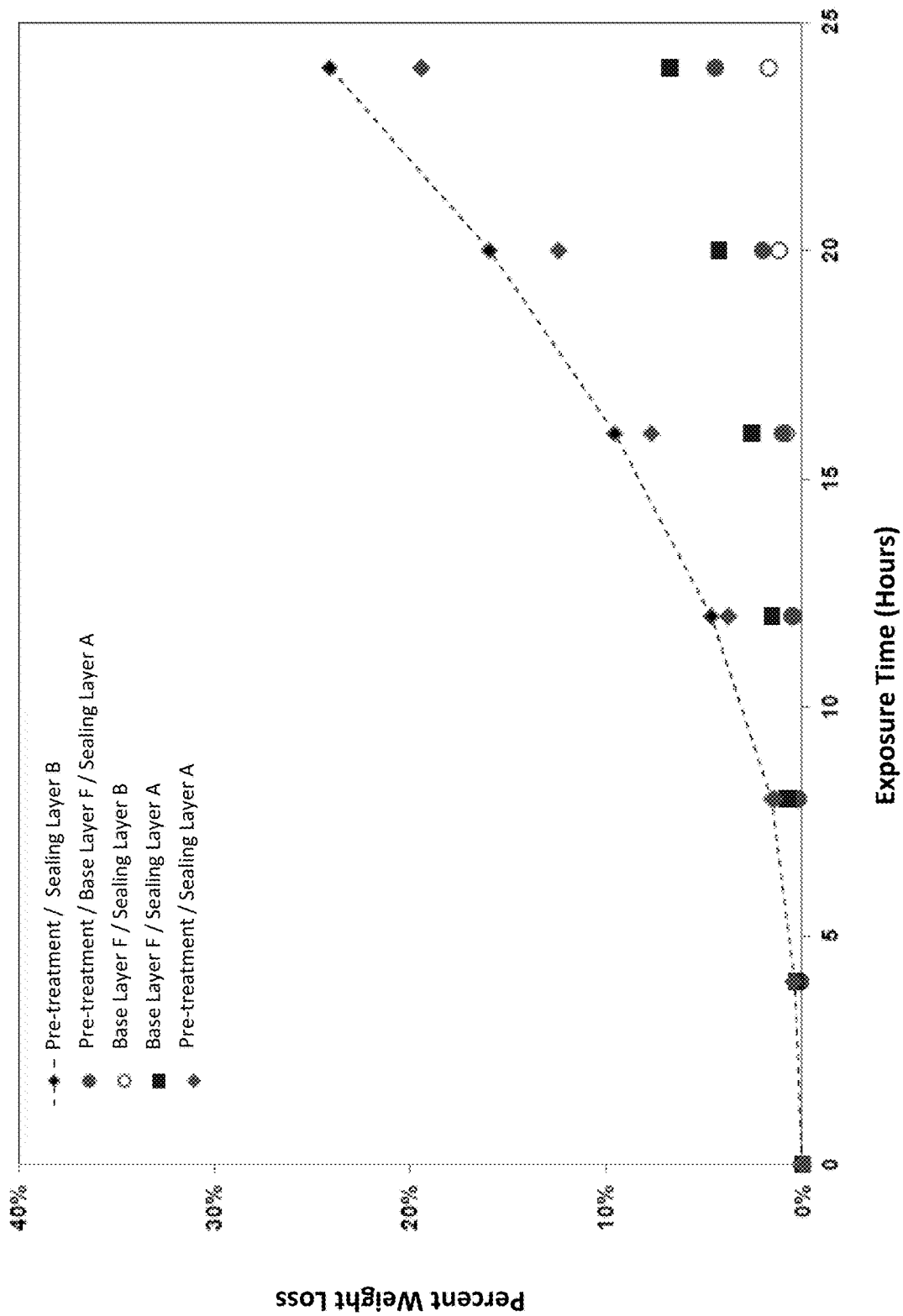
FIG. 4 illustrates further experimental data obtained from testing various glass compositions in accordance with various embodiments at 760° C. (1400° F.).

As illustrated in Table 2, oxidation protection systems comprising a base layer of boron nitride-comprising glass compositions B-E and sealing layer A exhibited a lower weight loss to oxidation at temperatures at and above 675° C. (1250° F.) than sealing layer A by itself. Further, with reference to FIG. 4, a number of combinations are illustrated, including various combinations of pre-treatment (such as, for example, step 210), base layers, and sealing layers. For example, FIG. 4 illustrates the performance of a composition comprising a base layer of glass composition F and a sealing layer B provides improved oxidation protection over sealing layer A itself. Other combinations include a base layer of glass composition F and a sealing layer B (without pre-treatment), and a base layer of F with a sealing layer of A (without pre-treatment).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for limiting an oxidation reaction in a composite substrate, comprising:
    applying a base layer comprising a first phosphate glass composition on an outer surface of a carbon-carbon composite structure, wherein the first phosphate glass composition comprises a plurality of graphene nanoplatelets and a boron nitride additive; and
    heating the carbon-carbon composite structure to a temperature sufficient to adhere the base layer to the carbon-carbon composite structure.

2. The method of claim 1, wherein the first phosphate glass composition of the base layer comprises between about 15 weight percent and about 30 weight percent the boron nitride additive.

3. The method of claim 1, wherein the first phosphate glass composition is represented by the formula $a(A'_2O)_x(P_2O_5)_{y1}b(G_fO)_{y2}c(A"O)_z$:
    A' is selected from: lithium, sodium, potassium, rubidium, cesium, and mixtures thereof;
    $G_f$ is selected from: boron, silicon, sulfur, germanium, arsenic, antimony, and mixtures thereof;
    A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;
    a is a number in the range from 1 to about 5;
    b is a number in the range from 0 to about 10;
    c is a number in the range from 0 to about 30;
    x is a number in the range from about 0.050 to about 0.500;
    $y_1$ is a number in the range from about 0.040 to about 0.950;
    $y_2$ is a number in the range from 0 to about 0.20; and
    z is a number in the range from about 0.01 to about 0.5;
    $(x+y_1+y_2+z)=1$; and
    $x<(y_1+y_2)$.

4. The method of claim 1, further comprising:
    applying a sealing layer comprising a second phosphate glass composition on an outer surface of the base layer, wherein the second phosphate glass composition is substantially free of boron nitride; and
    heating the carbon-carbon composite structure to a temperature sufficient to adhere the sealing layer to the base layer.

5. The method of claim 4, wherein the second phosphate glass composition is represented by the formula $a(A'_2O)_x(P_2O_5)_{y1}b(G_fO)_{y2}c(A"O)_z$:
    A' is selected from: lithium, sodium, potassium, rubidium, cesium, and mixtures thereof;
    $G_f$ is selected from: boron, silicon, sulfur, germanium, arsenic, antimony, and mixtures thereof;
    A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;
    a is a number in the range from 1 to about 5;
    b is a number in the range from 0 to about 10;
    c is a number in the range from 0 to about 30;
    x is a number in the range from about 0.050 to about 0.500;
    $y_1$ is a number in the range from about 0.040 to about 0.950;
    $y_2$ is a number in the range from 0 to about 0.20; and
    z is a number in the range from about 0.01 to about 0.5;
    $(x+y_1+y_2+z)=1$; and
    $x<(y_1+y_2)$.

6. The method of claim 4, further comprising forming a second slurry of the second phosphate glass composition by combining the second phosphate glass composition with a second carrier fluid, wherein applying the sealing layer of the second phosphate glass composition on the base layer comprises spraying or brushing the second slurry of the second phosphate glass composition on the base layer.

7. The method of claim 6, wherein the second slurry further comprises an aluminum phosphate.

8. The method of claim 1, comprising forming a first slurry of the first phosphate glass composition by combining a pulverized first phosphate glass matrix with a first carrier fluid, the plurality of graphene nanoplatelets, and the boron nitride additive.

9. The method of claim 1, wherein prior to applying the base layer of the first phosphate glass composition to the carbon-carbon composite structure, a pretreating composition is applied to the outer surface of the carbon-carbon composite structure, the pretreating composition comprising one of a phosphoric acid and an acid phosphate salt, an one aluminum salt, and an additional salt, and wherein the carbon-carbon composite structure is porous and the pretreating composition penetrates at least some of a plurality of pores of the carbon-carbon composite structure.

10. The method of claim 1, wherein prior to applying the base layer of the first phosphate glass composition to the carbon-carbon composite structure, a first pretreating composition is applied to the outer surface of the carbon-carbon composite structure, the first pretreating composition comprising aluminum oxide and water, wherein after heating the pretreating composition, a second pretreating composition comprising one of a phosphoric acid and an acid phosphate salt, and an aluminum salt is applied to an outer surface of the first pretreating composition, wherein the carbon-carbon composite structure is porous and the second pretreating composition penetrates at least some of a plurality of pores of the carbon-carbon composite structure.

\* \* \* \* \*